US006732216B2

(12) United States Patent
Shaw

(10) Patent No.: US 6,732,216 B2
(45) Date of Patent: May 4, 2004

(54) PERIPHERAL SWITCHING DEVICE WITH MULTIPLE SETS OF REGISTERS FOR SUPPORTING AN ACPI FULL-OPERATION STATE

(75) Inventor: Ronald D. Shaw, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 09/769,913

(22) Filed: Jan. 25, 2001

(65) Prior Publication Data

US 2002/0099899 A1 Jul. 25, 2002

(51) Int. Cl.[7] .............................................. G06F 13/14
(52) U.S. Cl. ........................ 710/305; 710/306; 710/316; 710/100; 710/15; 713/1; 713/300
(58) Field of Search ................................. 710/100, 305, 710/306, 316, 2, 5, 62, 63, 15; 713/1, 2, 300; 345/168

(56) References Cited

U.S. PATENT DOCUMENTS

| 5,590,338 A | | 12/1996 | Parks et al. ................. 395/742 |
|---|---|---|---|
| 5,608,884 A | | 3/1997 | Potter .......................... 395/309 |
| 5,742,794 A | | 4/1998 | Potter .......................... 395/500 |
| 5,809,262 A | | 9/1998 | Potter .......................... 395/309 |
| 5,848,292 A | * | 12/1998 | Nathan ........................... 710/2 |
| 5,903,894 A | * | 5/1999 | Reneris ....................... 707/100 |
| 5,923,897 A | * | 7/1999 | Lipe et al. ....................... 710/5 |
| 6,065,121 A | * | 5/2000 | Hobson et al. ............. 713/300 |
| 6,131,131 A | * | 10/2000 | Bassman et al. .............. 710/15 |
| 6,167,511 A | * | 12/2000 | Lewis ............................ 713/2 |
| 6,185,677 B1 | * | 2/2001 | Nijhawan ....................... 713/2 |
| 6,219,742 B1 | * | 4/2001 | Stanley ........................ 710/260 |
| 6,266,776 B1 | * | 7/2001 | Sakai ........................... 713/300 |
| 6,272,642 B2 | * | 8/2001 | Pole et al. ................... 713/300 |
| 6,360,327 B1 | * | 3/2002 | Hobson ........................ 713/300 |
| 6,378,009 B1 | * | 4/2002 | Pinkston et al. .............. 710/62 |
| 6,378,014 B1 | * | 4/2002 | Shirley ........................ 710/100 |
| 6,388,658 B1 | * | 5/2002 | Ahern et al. ................. 345/168 |
| 6,446,213 B1 | * | 9/2002 | Yamaki ....................... 713/300 |
| 6,457,082 B1 | * | 9/2002 | Zhang et al. ................ 710/260 |
| 6,499,102 B1 | * | 12/2002 | Ewertz .......................... 713/1 |
| 6,532,505 B1 | * | 3/2003 | Stracovsky et al. ........... 710/63 |
| 6,567,869 B2 | * | 5/2003 | Shirley ......................... 710/62 |

OTHER PUBLICATIONS

Intel, Microsoft, and Toshiba, "Advanced Configuration and Power Interface Specification", Feb., 1999, V. 1.0b, pp 55–58.*
"Advanced Configuration and Power Interface Specification," Intel, Microsoft, Toshiba, Revision 1.0b, pp. 25—35 and pp. 37—56, Feb. 2, 1999.

* cited by examiner

Primary Examiner—Xuan M. Thai
Assistant Examiner—Justin King
(74) Attorney, Agent, or Firm—Hamilton & Terrile, LLP; Stephen A. Terrile

(57) ABSTRACT

In order to allow a computer system in a multiple system architectures to continue operating while another system has control over common devices, a set of registers is provided for that computer system and the other computer systems in the computer architecture. A switch isolates the set of registers from other computer systems that do not need to access the particular register set. The switch also provides isolation of the computer system from the commonly controlled input and output peripheral devices. The computing systems may utilize similar processors or CPUs or they may be dissimilar processors or CPUs.

14 Claims, 4 Drawing Sheets

PERIPHERAL SWITCHING DEVICE WITH MULTIPLE SETS OF REGISTERS FOR SUPPORTING AN ACPI FULL-OPERATION STATE

BACKGROUND OF THE INVENTION

1. Field of the Invention

This invention relates to a computer system, and more particularly to a computer architecture that integrates multiple systems within a system. The computer architecture allows systems to remain fully operational and updated as to control status of peripheral and input output devices. The systems remain fully operational, capable of processing and performing complete functions, even while another system has control over the peripheral or input output devices.

2. Description of the Related Art

Computer architectures can incorporate multiple computer systems with system having its own central processing unit and memory. The systems, however, share common peripherals such as a display and input output devices such as keyboards, mice, and disk drives. In some cases the computer systems utilize the same type of processor, allowing application programs and files to be shared between systems. In these computer architectures one computer system controls the common devices and directly interfaces to a user while the other system or systems, in a less than optimal manner, processes or computes in the background. In other cases the computer architecture may use dissimilar computing systems. One computing system may have certain advantages over the other system that the user desires to make use of. At other times the user may desire to take advantage of the features of the other computer system.

Regardless of the number of computer systems that are employed, typically computer architectures provide for one set of registers with each register assigned to a particular commonly shared peripheral or input output (IO) device. For example, a floppy disk drive (FDD) register is assigned to the floppy disk drive. This information contained in the register provides address and access content to the CPU or CPUs. In a multiple system computer architecture, when a particular computer system has control over the commonly shared devices, the set of registers is accessed by the CPU of that computer system in control of the shared devices. The other system or systems are isolated from the registers.

When a system and its CPU are isolated from the registers, whenever that system receives control over the common devices that system must also be able to access the registers. Typically, a reset to the system and CPU is needed. Alternatively, the CPU can be placed in a suspend or sleep state. This is particular true for CPUs that comply with the advanced configuration and power interface (ACPI) specification. The ACPI specification is an open industry specification which establishes industry-standard interfaces for operating system (OS) directed configuration and power management for computing systems such as personal computers, namely desktop and notebook computers.

The ACPI specification enables new power management technology to evolve independently in OS and hardware and ensures that they continue to work together. An ACPI-compatible OS can balance processor performance against power consumption and thermal states by manipulating the processor clock speed and cooling controls.

Suspend or sleep states are provided by the ACPI specification. Sleep states are used to help minimize system power consumption, manage system thermal limits, and maximize system battery life. Power management involves tradeoffs among system speed, noise, processing speed, battery life, and alternating current power consumption. The following are sleep states for a CPU, as defined by the ACPI specification. The "S0" state is a full running state in which the CPU is on and fully operative. The "S1" state is a sleep state with low wake-up latency. In "S1" state, no computer system context is lost and the system hardware maintains all system context. The "S2" state is also a low wake-up latency sleeping state. "S2" state is similar to the "S1" state except the CPU and system cache context is lost; the OS is responsible for maintaining the caches and the CPU context. The "S3" sleep state is a low wake-up latency sleeping state where all system context is lost except system memory. In the "S3" state, CPU, cache, and chip set context are lost, and hardware maintains memory context. The "S4" sleep state is the lowest power, longest wake-up latency sleeping state defined by the ACPI specification. In the "S4" state, in order to reduce power to a minimum, the hardware platform powers off all devices, while platform context is maintained. The "S5" state is the "off" state. The "S5" state places the system in the "soft" off state and requires a complete boot when awakened.

In computer architectures with multiple systems and using one set of registers the following is true for processors or CPUs that follow the ACPI specification. The family of Intel Pentium®based processors in particular follow the ACPI specification and is used as an example. In a computer architecture that uses an Intel Pentium®based processor, a single set of registers is provided. The registers identify the devices, control status, and availability to the processor. The processor continuously looks at the registers to determine the peripheral or IO devices that are available. In an architecture with multiple, and in particular dual, computing systems, when one system has control of the peripherals or IO devices, the other system with an Intel Pentium®processor should be placed in a sleep state. Otherwise, if the Intel Pentium®processor is allowed to continue operating at full capability, the Intel Pentium®processor will continuously look for the registers. The Intel Pentium®processor should be placed in an "S3," "S4," or "S5" state so that it is not running or will not be able to run. Considering that the highest operating state, "S3," only allows the processor to maintain system memory and system context is lost, the isolated Intel Pentium®processor based system that does not control the common peripherals and IO devices essentially is turned off. Processing for the isolated Intel Pentium®based system is essentially discontinued, while another system is in control.

Now referring to FIG. 1, illustrated is a computing architecture with two computing systems. In this example two dissimilar computing systems are used in the computer architecture. Both systems share common peripheral and IO devices. Illustrated are a PC-based system 100 and a personal digital assistant (PDA) based system 105. The PC system 100 is connected to quick switch 115 by a low pin count (LPC) bus 120. The quick switch 115 can isolate the PC system 100 from the PDA system 105, and allows either system to control a common set of peripherals or IO devices 135. In this example, the PC system 100 can be looked as a "master" device and the PDA system 105 looked as a "slave" device. When the PDA system 105, however, is in control of the common peripheral or IO devices 135, the PC system 100 is isolated from the peripheral or IO devices 135 and the device registers. The quick switch 115 connects the PDA system 105 by a LPC bus 125. The LPC bus 125, the quick switch 115, and the LPC bus 120 combine to connect the PC system 100 to a super input output embedded controller 110 (SIO EC). The SIO EC 110 is connected to the quick switch 115 and the PDA system 105 by LPC bus 125. The PC system 100 isolation control is provided from the quick switch 115 to SIO EC 110 represented by multiplexor control bus 130. The SIO EC 110 is the interface to a set of commonly shared peripheral or IO devices 135. Within the SIO EC registers assigned to the particular peripheral or IO devices may reside. Whenever either the PC system 100 or the PDA system 105 control the peripheral or IO devices 135, the other system cannot access the registers. In the event the PC system 100 is isolated, it must discontinue processing and placed in an appropriate ACPI sleep state.

A need has been felt for a computing architecture and method that allows a computer system to continue full processing and computing operations while another system has control over commonly shared peripherals and IO devices. This architecture and method would provide maximum processing capability for the multiple systems in the computer architecture, allow continuous processing and computing, and avoid the need to reset or place in a suspend state any or all of the processors.

SUMMARY OF THE INVENTION

The aforementioned and other features are accomplished, according to the present invention, by providing a dedicated set of registers to each computing system in a multiple system computing architecture. A computing system that must continuously look for register information is allowed to continue full computing operations since it will always have access to required registers.

An embedded controller is provided to allow access for a computer system in control to commonly shared peripheral or IO devices. A switch isolates computer systems that are not in control at a particular moment. The switch also isolates registers from other systems in order not to confuse particular computer systems.

Since each computing system has certain requirements as to which peripherals are needed to have access to, the dedicated registers may be modified by enabling, disabling or elimination. Each register will have access to a particular device or port related to a device.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

Figure 1:
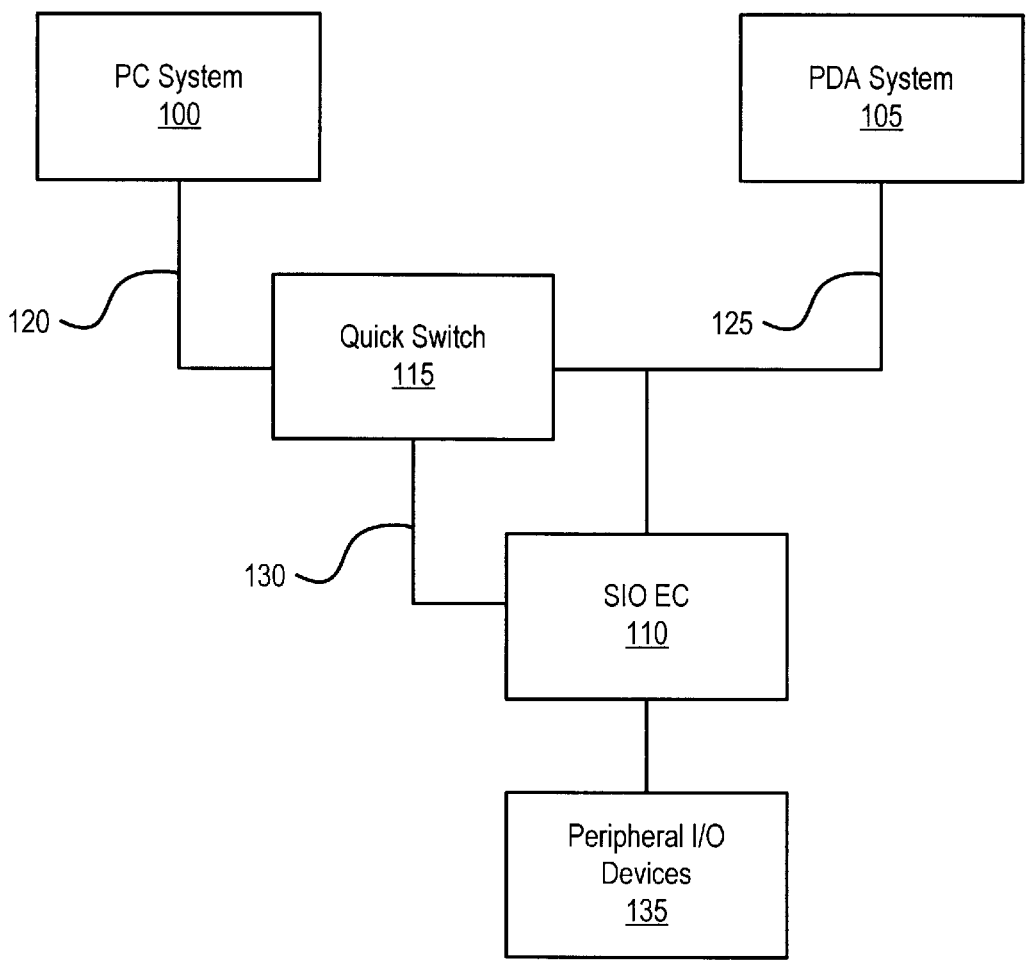
FIG. 1 illustrates a computer architecture with two computing systems.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 2:
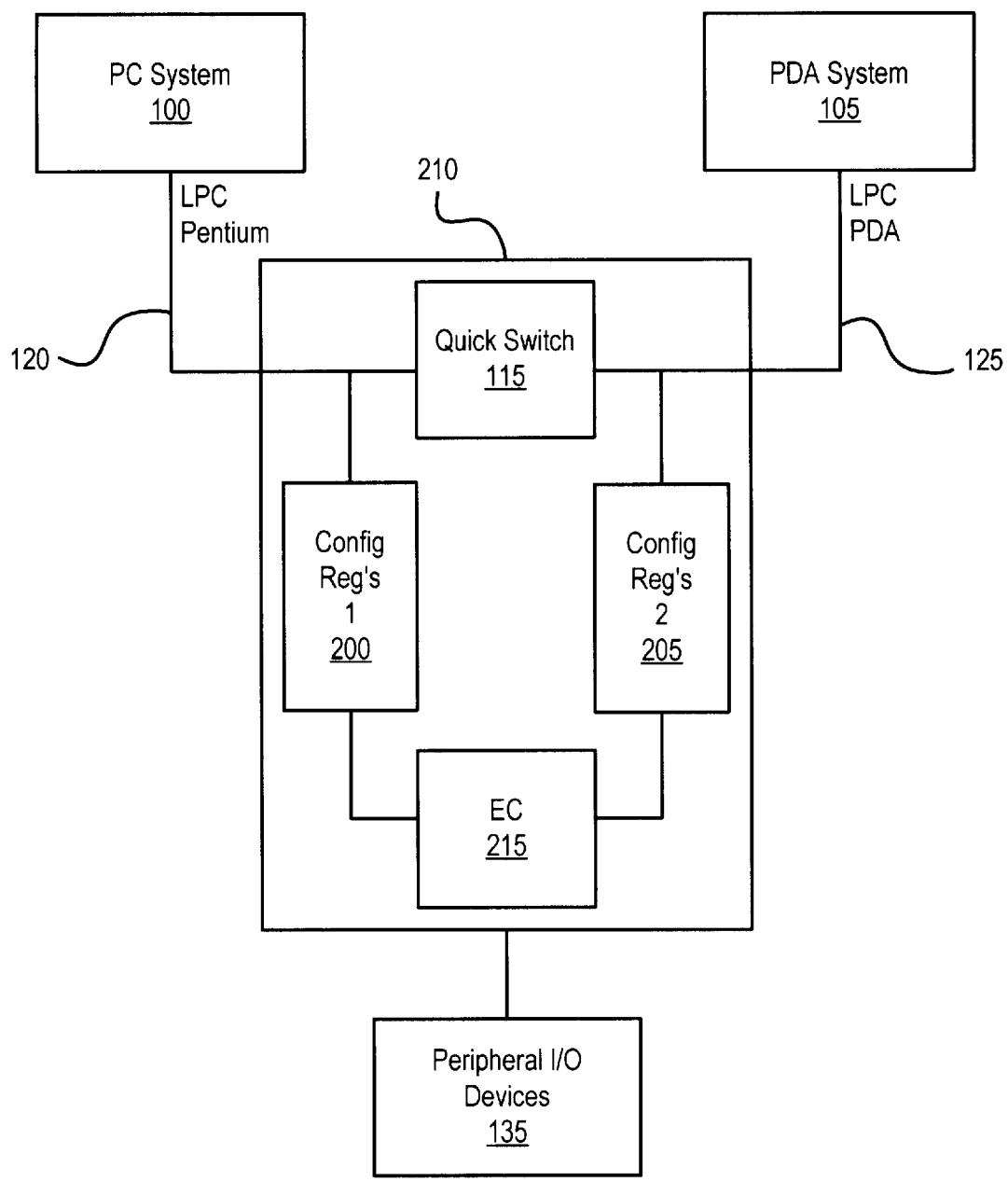
FIG. 2 illustrates a dual system architecture with two sets of configuration registers.

Now referring to FIG. 2, illustrated is a dual system computer architecture with two sets of configuration registers. One set of registers is provided for each computer system. An SIO EC 210 is provided in this particular embodiment. As illustrated SIO EC 210 contains a quick switch 115. Alternatively, the quick switch 115 may be located external to SIO EC 210. The quick switch 115 isolates either the PC system 100 or the PDA system 105. As one system is isolated, the other system has access to the peripherals or IO devices 135. An embedded controller 215 residing in the SIO EC 210 provides access to the peripherals or IO devices 135. Similar to the quick switch 115, the embedded controller 215 can be placed external to the SIO EC 210. SIO EC 110 contains two sets of registers, configuration registers one 200 and configuration registers two 205. Configuration registers one 200 is located on one side of the quick switch 115 and configuration registers two is located on the other side of the quick switch 115. Both sets of registers are connected to the embedded controller 215.

Configuration registers one 200 is a dedicated set of registers for the PC system 100, and configuration registers two 205 is a dedicated set of registers for PDA system 105. Configuration registers one 200 is continuously made available to the PC system 100 by way of the LPC bus 120. In a similar arrangement, configuration registers two 205 is continuously made available to the PDA system 105 by way of the LPC bus 125. Described are low pin count busses, however, other busses may also be used.

During typical operation, when the PC system 100 is running as the master system all the configuration registers two 205 on the PDA system 105 side are disabled since the PDA system 105 would be running as a slave device to the PC system 100. When the PDA system 105 becomes the master system, which can take place if the user instructs the software control to place the PDA system 105 as master. This process can be undertaken by having the PC system 100 send a message to the SIO EC 110. The SIO EC 110 will isolate the PDA system 105 side and will also isolate the PC system 100 side and devices that are to be enabled for the PDA system 105 side. It is expected that the PDA system 105 will not take over all the devices since only certain peripheral or I/O devices are needed by the PDA system 105. When isolation is complete, the devices are enabled for use by the PDA system 105 side. The PDA system 105 becomes the master system in control. The PDA system 105 will configure the configuration registers two 205 and run as the master computing system. The PDA system 105 will treat the PC system 100 as being nonexistent. When PDA system 105 has completed its task and PC system 100 desires to be the master system, the following scenario takes place.

When PDA system 105 goes back into slave mode, the SIO EC 110 will reset and disable the registers of configuration registers two 205. Resetting and disabling the configuration registers two 205 prevents the PC system 100 from seeing the registers and informs the quick switch 115 that the PC system 100 now is the master system and has access to the PDA system 105. During this entire time, the PC system 100 thinks that it has seen all the registers it needs to see. Having a dedicated set of registers for the PC system 100 allow the PC system 100 with a set of registers to continuously look at. The PC system 100 is able to continue processing in the background while the PDA system 100 is operative. The ACPI specification defined processor of the PC system 100 continues to run in fully operative "S0" state. The PC system 100 processor continues to see the peripheral or IO devices 135 as if the PC system 100 were in control of the peripheral or IO devices 135 when in actuality the PDA system 105 is in control. This setup allows the PC system 100 processor to stay in the higher "S0" power state and continue processing. Otherwise, under the ACPI specification requirements, the PC system 100 processor would have to go into one of the various suspend or sleep states.

Figure 3:
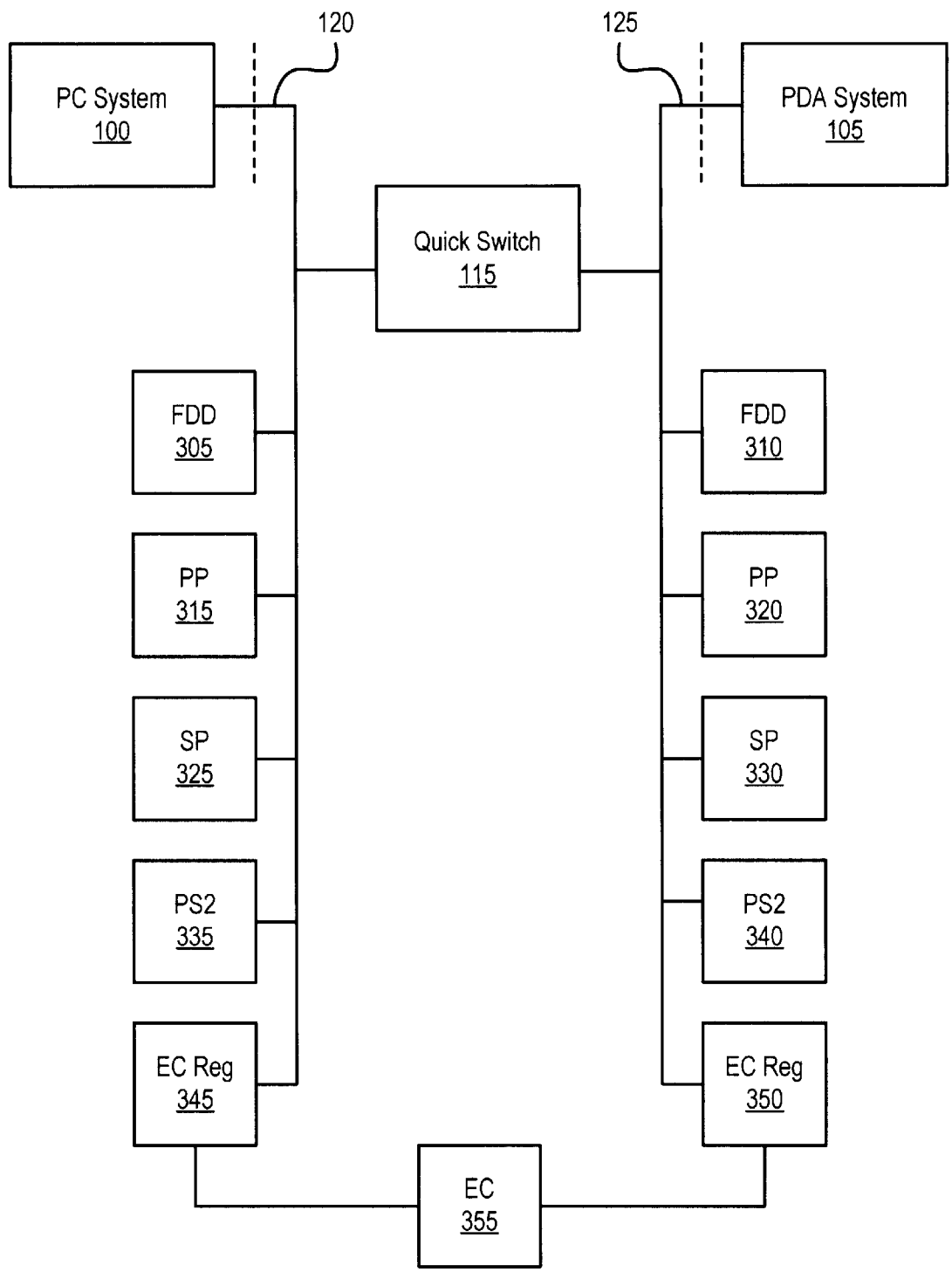
FIG. 3 illustrates two sets of registers used for a dual computer system architecture.

Now referring to FIG. 3, illustrated are two sets of registers used for a dual computer system architecture. One set of registers is provided for the PC system 100 and another set is provided to the PDA system 105. The quick switch 105 isolates a set of registers dependant on which computer system is in control. For the PC system 100, the LPC bus 120 connects it to its registers and to the embedded controller 355. For the PDA system 105, the LPC bus 125 connects it to its registers and to the embedded controller 355. Common peripherals or IO devices or access can include a floppy disk drive (FDD), a parallel port (PP), a serial port (SP), and a PS2 port (PS2). "PS2" is an IBM developed interface for keyboards and pointing devices.

An exact set of registers for PC system 100 and PDA system 105 are illustrated, however for a PDA system 105, certain registers are not needed and may be disabled. The PDA system 105 will not need control of all peripherals or IO devices, therefore individual registers may be turned off or eliminated. Illustrated in this particular embodiment is a set of registers for PC system that comprises of FDD register 305, PP register 315, SP register 325, PS2 register 335, and EC register 345. A counterpart set of registers is made available to the PDA system 105 comprising of FDD register 310, PP register 320, SP register 330, PS2 register 340, and EC register 350. Additional registers may be added or certain registers deleted depending on particular requirements of the computer architecture.

Figure 4:
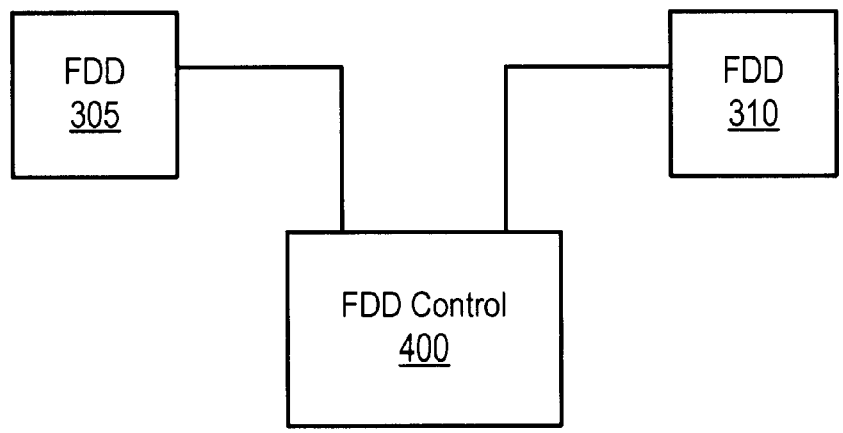
FIG. 4 illustrates register status information regarding different registers.
Figure 4:
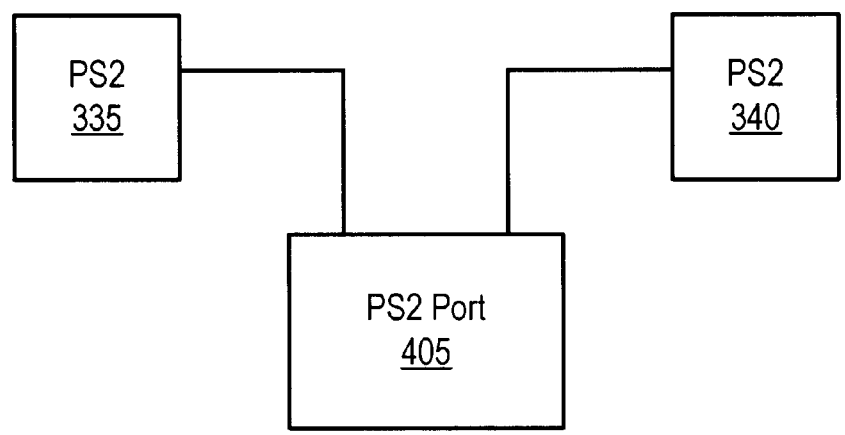

Now referring to FIG. 4 illustrated is register status information regarding the different registers. For example, for a floppy disk drive both registers are provided control status from FDD control 400. These registers are FDD register 305 and FDD register 310. Likewise PS2 register 335 and PS2 registers 340 receive information from the PS2 port 405 which contains summary information regarding status.

Now referring back to FIG. 2, control and operation of the busses and computer systems is illustrated. Described is a particular embodiment in how control of busses and registers are performed. A peripheral or IO device that is to function on the LPC bus 125 must be able to operate with the PC system 100 processor and support chips in the ACPI specification for "S0" through "S5" state operations. This requires the devices to have two LPC bus ports and supporting registers. In addition, any device with an embedded controller must be able to connect or isolate the LPC bus 120 and the LPC bus 125. If a SIO EC 210 does not have an embedded controller 215, an input signal, for example a signal defined as "PDA_MASTER," is required to indicate if the LPC bus 125 or the LPC bus 120 actually is connected to the real output ports that have been selected.

Logic or software control may be made available to the embedded controller 215 or the LPC bus 120 and the LPC bus 125 to control which devices will be available when the signal "PDA_MASTER" is asserted to the LPC bus 125. The peripheral or IO devices are then attached to the LPC bus 125 when the "PDA_MASTER" signal is asserted. When the "PDA_MASTER" signal is asserted, the configuration registers one 200 on the LPC bus 120 cannot be disabled if the processor of PC system 100 is in "S0," "S1" or "S2" state. If the processor of the PC system 100 is in "S3," "S4," or "S5" state, there cannot be back drive from the peripheral or IO devices to the LPC bus 120.

The LPC bus 125 will always be powered before or with the LPC bus 120. Peripheral or IO devices available to the LPC bus 125 can be powered when the LPC bus 120 is powered down. Selected devices must then be able to function. The embedded controller 215 is used to isolate or connect the LPC bus 120 bus to the LPC bus 125.

While the LPC bus 120 and the LPC bus 125 are connected, the configuration registers two 205 are undefined. When transitioning from connected to isolated, configuration registers two 205 are reset. Configuration registers two 205 are not available to the LPC bus 120.

Although the present invention has been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A computing architecture comprising:
   two or more computing systems, each computing system comprised of a processor and memory;
   a set of common peripheral devices;
   two or more sets of registers, each of the two or more sets of registers coupled between a respective computer system of the two or more computing system and the set of common peripheral devices each set of registers dedicated to a particular computing system; wherein each set of registers dedicated to a particular computer system provides control information to the particular computing system and allows each computing system to operate continuously while a particular computing system has control of the common peripheral devices.

2. The computing architecture of claim 1 further comprising:
   a switch device connecting the computing systems, that isolates the respective computing systems wherein a particular computing system is chosen to control the set of common devices.

3. The computing architecture of claim 2 wherein the switch device isolates a set of registers from the computing systems which the set of registers is not dedicated to.

4. The computing architecture of claim 3 further comprising:
   an embedded controller that provides interface to the common peripheral devices.

5. The computing architecture of claim 4 wherein the peripheral devices are input output devices.

6. The computing architecture of claim 3 wherein the peripheral devices are input output devices.

7. The computing architecture of claim 2 further comprising:
   an embedded controller that provides interface to the common peripheral devices.

8. The computing architecture of claim 7 wherein the peripheral devices are input output devices.

9. The computing architecture of claim 2 wherein the peripheral devices are input output devices.

10. The computing architecture of claim 1 further comprising:
    an embedded controller that provides interface to the common peripheral devices.

11. The computing architecture of claim 10 wherein the peripheral devices are input output devices.

12. The computing architecture of claim 1 wherein the peripheral devices are input output devices.

13. A method of maintaining computing capability in a computer system in a multiple system architecture comprised of:

continuously updating a processor in the computer system of control status of required register information related to controlled peripheral devices;

isolating register sets that are not required by the computer system;

providing control when the computer system is requested to have control; and isolating the computer system when another computer system is requested to have control, while maintaining computing power in the processor in the computer system.

14. The method of maintaining computing capability in a computer system of claim 13 further comprising:

providing control to a set of commonly controlled peripherals when the computer system is in control.

* * * * *